US008968856B2

(12) United States Patent
Hoffmüller et al.

(10) Patent No.: US 8,968,856 B2
(45) Date of Patent: Mar. 3, 2015

(54) SECURITY ELEMENT AND METHOD FOR ITS PRODUCTION

(75) Inventors: Winfried Hoffmüller, Bad Tölz (DE); Theodor Burchard, Gmund (DE)

(73) Assignee: Giesecke & Devrient GmbH, Munich (DE)

(*) Notice: Subject to any disclaimer, the term of this patent is extended or adjusted under 35 U.S.C. 154(b) by 1422 days.

(21) Appl. No.: 12/294,222

(22) PCT Filed: Mar. 19, 2007

(86) PCT No.: PCT/EP2007/002406

§ 371 (c)(1), (2), (4) Date: Sep. 23, 2008

(87) PCT Pub. No.: WO2007/115648

PCT Pub. Date: Oct. 18, 2007

(65) Prior Publication Data

US 2009/0115185 A1 May 7, 2009

(30) Foreign Application Priority Data

Mar. 31, 2006 (DE) ........................ 10 2006 015 023

(51) Int. Cl.
*B42D 15/00* (2006.01)
*B42D 15/10* (2006.01)
(Continued)

(52) U.S. Cl.
CPC ............ *B42D 25/29* (2014.10); *B42D 2033/26* (2013.01); *B42D 2035/24* (2013.01); *B42D 25/328* (2014.10)
USPC ........ 428/195.1; 428/689; 427/162; 427/271; 283/82; 283/91; 356/71

(58) Field of Classification Search
CPC ........... B42D 2033/26; B42D 2035/22; B42D 15/0013; B42D 15/203524; B42D 15/00; B42D 25/00; B42D 25/23; B42D 25/30; B42D 25/328; B42D 25/355; B42D 25/364; B42D 2035/24; B42D 2035/00; B32B 27/00; B32B 27/32; B32B 27/08; B32B 7/00; B32B 7/04; G03H 1/0011
USPC ............. 357/71; 428/1.1, 195.1, 689; 356/71; 283/85, 82, 83, 91; 427/162, 258, 271, 427/596
See application file for complete search history.

(56) References Cited

U.S. PATENT DOCUMENTS 4,856,857 A * 8/1989 Takeuchi et al. .................. 359/3
5,781,316 A 7/1998 Strahl et al.
(Continued)

FOREIGN PATENT DOCUMENTS

| | | |
|---|---|---|
| CA | 2032587 | 6/1991 |
| DE | 10318157 | 11/2004 |

(Continued)

OTHER PUBLICATIONS

International Search Report, International Application No. PCT/EP2007/002406, 3 pages, Jul. 27, 2007.
(Continued)

*Primary Examiner* — Mark Ruthkosky
*Assistant Examiner* — Laura C Powers
(74) *Attorney, Agent, or Firm* — Lathrop & Gage LLP

(57) ABSTRACT

The present invention relates to a security element (20) for security papers, value documents and the like having a diffraction pattern that exhibits an embossed relief pattern (24, 26) and a coating layer (28, 32) that increases the visibility of the diffraction effect of the embossed relief pattern (24, 26). According to the present invention, the relief pattern (24, 26) is formed on the basis of a cholesteric liquid crystalline material (24) and the coating layer (28, 32) includes a reflective (28) and/or a high-index layer (32).

21 Claims, 2 Drawing Sheets

Figure 1:
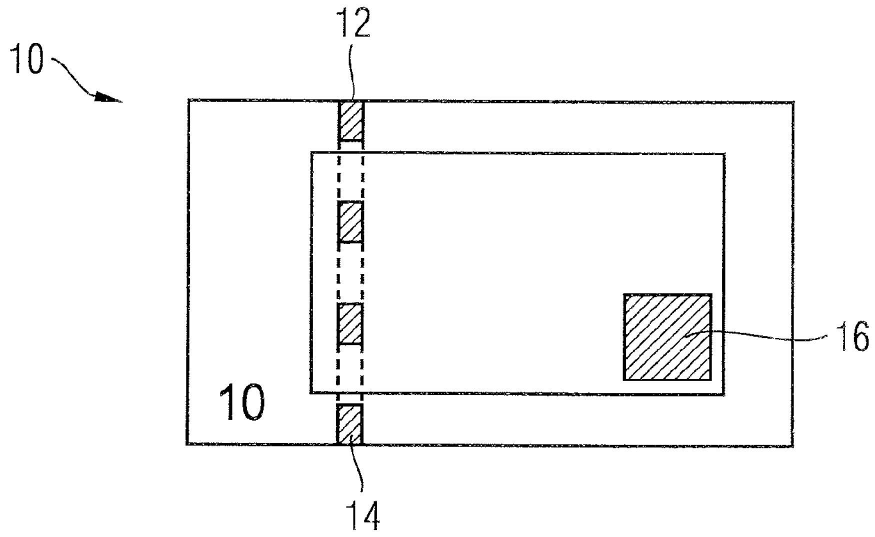

(51) Int. Cl.

| | |
|---|---|
| ***B32B 9/00*** | (2006.01) |
| ***B32B 19/00*** | (2006.01) |
| ***B32B 5/06*** | (2006.01) |
| ***B42D 25/29*** | (2014.01) |
| *B42D 25/328* | (2014.01) |

(56) References Cited

U.S. PATENT DOCUMENTS

| | | | | |
|---|---|---|---|---|
| 7,316,422 | B1 * | 1/2008 | Schmitz | 283/91 |
| 7,667,894 | B2 | 2/2010 | Hoffmuller | |
| 7,728,931 | B2 | 6/2010 | Hoffmuller | |
| 7,808,605 | B2 | 10/2010 | Hoffmuller | |
| 2003/0164611 | A1 * | 9/2003 | Schneider et al. | 283/57 |
| 2006/0251863 | A1 * | 11/2006 | Katschorek et al. | 428/172 |
| 2006/0275625 | A1 * | 12/2006 | Lieberman | 428/697 |
| 2007/0165182 | A1 | 7/2007 | Hoffmuller | |
| 2007/0211238 | A1 | 9/2007 | Hoffmuller | |
| 2007/0216518 | A1 | 9/2007 | Hoffmuller | |
| 2007/0229928 | A1 | 10/2007 | Hoffmuller | |
| 2007/0241551 | A1 | 10/2007 | Graff | |
| 2007/0246933 | A1 * | 10/2007 | Heim et al. | 283/98 |
| 2007/0274559 | A1 | 11/2007 | Depta | |
| 2008/0014378 | A1 | 1/2008 | Hoffmuller | |
| 2008/0054621 | A1 | 3/2008 | Burchard | |
| 2008/0079257 | A1 | 4/2008 | Fessl | |
| 2008/0088859 | A1 | 4/2008 | Depta | |
| 2008/0160226 | A1 | 7/2008 | Kaule | |
| 2008/0163994 | A1 | 7/2008 | Hoppe | |
| 2008/0198468 | A1 | 8/2008 | Kaule | |
| 2008/0216976 | A1 | 9/2008 | Ruck | |
| 2008/0250954 | A1 | 10/2008 | Depta | |
| 2008/0258456 | A1 | 10/2008 | Rahm | |
| 2009/0001709 | A1 | 1/2009 | Kretschmar | |
| 2009/0008923 | A1 | 1/2009 | Kaule | |
| 2009/0008926 | A1 | 1/2009 | Depta | |
| 2009/0102605 | A1 | 4/2009 | Kaule | |
| 2009/0115185 | A1 | 5/2009 | Hoffmuller | |
| 2009/0236061 | A1 | 9/2009 | Gruszczynski | |
| 2009/0297805 | A1 | 12/2009 | Dichtl | |
| 2009/0322071 | A1 | 12/2009 | Dichtl | |

FOREIGN PATENT DOCUMENTS

| | | | | |
|---|---|---|---|---|
| EP | 0330733 | A1 | | 9/1989 |
| EP | 0435029 | A2 | | 7/1991 |
| EP | 0911758 | A2 | | 7/1998 |
| EP | 1028359 | A1 | | 8/2000 |
| EP | 1079245 | A2 | | 2/2001 |
| EP | 1203968 | A1 | | 5/2002 |
| EP | 1310381 | A2 | | 5/2003 |
| EP | 1547807 | A2 | | 6/2005 |
| EP | 2042576 | A1 | * | 4/2009 |
| GB | 2276883 | A | | 10/1994 |
| JP | 2003185835 | A | | 7/2003 |
| WO | WO 99/13157 | A1 | | 3/1999 |
| WO | WO 0103945 | A1 | * | 1/2001 |
| WO | WO 0116426 | A1 | * | 3/2001 |
| WO | WO 0202350 | A1 | * | 1/2002 |
| WO | WO 2004095090 | A1 | * | 11/2004 |
| WO | WO 2005/063495 | A1 | | 7/2005 |
| WO | WO 2005/108108 | A2 | | 11/2005 |
| WO | WO 2005105473 | | | 11/2005 |
| WO | WO 2005105474 | | | 11/2005 |
| WO | WO 2005105475 | | | 11/2005 |
| WO | WO 2005108106 | | | 11/2005 |
| WO | WO 2005108108 | | | 11/2005 |
| WO | WO 2005108110 | | | 11/2005 |
| WO | WO 2006/007742 | A1 | | 1/2006 |
| WO | WO 2006005434 | | | 1/2006 |
| WO | WO 2006015733 | | | 2/2006 |
| WO | WO 2006018171 | | | 2/2006 |
| WO | WO 2006018171 | A2 | * | 2/2006 |
| WO | WO 2006018172 | | | 2/2006 |
| WO | WO 2006040069 | | | 4/2006 |
| WO | WO 2006056342 | | | 6/2006 |
| WO | WO 2006072380 | | | 7/2006 |
| WO | WO 2006087138 | | | 8/2006 |
| WO | WO 2006099971 | | | 9/2006 |
| WO | WO 2006119896 | | | 11/2006 |
| WO | WO 2006128607 | | | 12/2006 |
| WO | WO 2007006445 | | | 1/2007 |
| WO | WO 2007006455 | | | 1/2007 |
| WO | WO 2007076952 | | | 7/2007 |
| WO | WO 2007079851 | | | 7/2007 |
| WO | WO 2007115648 | | | 10/2007 |
| WO | WO 2008/000350 | | | 1/2008 |
| WO | WO 2008/000351 | | | 1/2008 |

OTHER PUBLICATIONS

International Preliminary Report on Patentability, International Application No. PCT/EP2007/002406, 4 pages, Jul. 21, 2008, English Translation.

* cited by examiner

SECURITY ELEMENT AND METHOD FOR ITS PRODUCTION

CROSS-REFERENCE TO RELATED APPLICATIONS

This application is the U.S. National Stage of International Application No. PCT/EP2007/002406, filed Mar. 19, 2007, which claims the benefit of German Patent Application DE 10 2006 015 023.6, filed Mar. 31, 2006; both of which are hereby incorporated by reference to the extent not inconsistent with the disclosure herewith.

The present invention relates to a security element for security papers, value documents and the like having a diffraction pattern that exhibits an embossed relief pattern and a coating layer that increases the visibility of the diffraction effect of the embossed relief pattern. The present invention also relates to a security paper and a value document having such a security element, as well as a method for manufacturing such security elements.

Holograms, holographic grating images and other hologram-like diffraction patterns are frequently used to safeguard the authenticity of credit cards, value documents, product packaging and the like. Such diffraction optical patterns for security elements are described, for instance, in the publication EP 0 330 733 A1.

Since recent years, however, holograms and hologram-like diffraction patterns are increasingly being used not only as security features, but also purely decoratively in non-security-critical applications, such that viewer awareness for holograms used as security features is diminishing. In many cases, the characteristic visual effect is no longer perceived by viewers as a security feature, but rather merely as a design variant. Beyond the holographic effect, conventional embossed holograms exhibit no particular counterfeit security.

Based on that, the object of the present invention is to specify a generic security element that avoids the disadvantages of the background art and that especially exhibits high counterfeit security. Furthermore, it is intended to specify a method for manufacturing such a security element.

This object is solved by the security element and the manufacturing method having the features of the independent claims. Developments of the present invention are the subject of the dependent claims.

According to the present invention, in a generic security element is provided that the relief pattern is formed based on a cholesteric liquid crystalline material and that the coating layer includes a reflective and/or a high-index layer. This design combines a holographic effect that stands out clearly with a conspicuous and well visible color-shift effect.

In an advantageous variant of the present invention, the relief pattern is formed from a cholesteric liquid crystalline polymer material. In this variant, the layer thickness of the embossed relief pattern is preferably between about 1.5 μm and about 4 μm.

According to another, likewise advantageous variant of the present invention, the liquid crystalline material of the relief pattern is present in the form of pigments that are embedded in a binder matrix. Here, the binder expediently exhibits thermoplastic properties. In this embodiment, the dimension of the pigments can, to the extent that they are sufficiently transparent, significantly exceed the modulation level of the relief pattern, since the diffraction effect is created by the coaction of the embossed binder with the reflective or high-index coating layer. In this variant, the preferred layer thickness is thus a higher figure, in the range of about 3 μm to about 10 μm.

For reasons of structural stability, it is preferred that the liquid crystalline material be present in crosslinked form. This can be achieved, for example, by the use of a UV-crosslinking liquid crystal system, as described in greater detail below. Such liquid crystal systems can advantageously be formed by combining a cholesteric liquid crystal system with a twister. Examples of suitable UV-crosslinking liquid crystal systems are radically curing liquid crystal systems in which the UV-crosslinkability is achieved via reactive double bonds, such as acrylate groups. Here, the complete system is expediently formulated such that build-up on the embossing die is avoided.

In the event that the liquid crystalline material is present in the form of embedded pigments in a binder matrix, primarily the choice of the binder is decisive for the structural stability of an embossing. As mentioned, the binder for this is preferably thermoplastic. For example, PMMA may be used as a thermoplastic binder. It can advantageously be dissolved in a solvent and, after introducing the pigments composed of liquid crystalline material, pressed, physically dried, and thereafter embossed. Alternatively, also a UV-crosslinking system can be used as the binder. Examples of suitable UV crosslinking systems are polyesteracrylates, polyurethane acrylates, polyether acrylates and epoxy acrylates in conjunction with a suitable reactive thinner. In this variant, too, the liquid crystal pigments are preferably formed by crosslinked liquid crystals that are temperature stable.

In an advantageous embodiment, the coating layer includes a reflective metal layer that is present in at least some regions and that can exhibit gaps in the form of patterns, characters or codes. In the coating layer, a high-index layer is advantageously disposed over the reflective layer. Both in cases in which the high-index layer is combined with a reflective layer and in cases in which the coating layer includes only a high-index layer, said layer can be formed, for example, from ZnS or $TiO_2$.

The liquid crystalline material of the relief pattern is preferably applied on a substrate foil designed for the alignment of liquid crystals. Alternatively, the substrate foil can also be provided with an alignment layer for the alignment of liquid crystals. For example, a smooth PET foil of good surface quality can advantageously be used as the substrate foil. The substrate foil can also comprise multiple sub-layers, for example, an above-mentioned alignment layer. For example, a layer composed of a linear photopolymer, a finely structured layer or a layer aligned by the application of shear forces may be used as the alignment layer. A suitable finely structured layer can be manufactured, for example, by embossing, etching or scoring.

To further increase the brilliance of the color effects, the security element can include an absorbent background region for viewing the diffraction effect and the color-shift effect. The background region is especially formed by a dark, for example, black printing layer and can also include further security features, such as magnetic or electrically conductive feature substances.

To intensify the color-shift effect or to produce further effects, such as polarization effects, the security element can also include one or more further layers composed of liquid crystalline material.

In a further preferred embodiment, the diffraction patterns form a matte pattern and thus a matte, preferably silvery-matte appearance. Here, the relief patterns of the diffraction patterns include an electromagnetic-radiation-influencing grating pattern that is characterized by the parameters orientation, curvature, spacing and profile, and for which at least one of these parameters varies randomly across the surface of the grating region, that is, is subject to a statistical distribution.

The described security element can especially be a security strip, a security thread, a label or a transfer element for application to a security paper, value document or the like.

The present invention also comprises a security paper for manufacturing security documents, such as banknotes, identification cards or the like, that is furnished with an above-described security element, as well as a value document furnished with an above-described security element, such as a banknote.

The present invention further includes a method for manufacturing a security element of the kind described, in which a) a layer based on a cholesteric liquid crystalline material is applied to a substrate foil, b) the applied layer is embossed to form a relief pattern of a desired diffraction pattern, and c) the embossed layer is provided with a visibility-increasing coating layer that includes a reflective and/or a high-index layer.

In a preferred method procedure, in step a), the layer based on the cholesteric liquid crystalline material is imprinted, the printing method being chosen according to the requirements of the lacquer system used.

Prior to the embossing in step b), the layer applied in step a) can be precured in the manner described in greater detail below.

Particularly when no precuring occurs, in the embossing in step b), the applied layer is expediently radiation cured at least to the extent that the embossed patterns do not dissolve in the subsequent method steps. Here, the curing during embossing especially occurs by impinging on the applied layer with UV radiation or electron radiation. This impingement can occur through the substrate foil, or also through the embossing die.

Prior to the application of the coating layer in step c), the embossed layer is advantageously cured, especially by impingement with UV radiation or electron radiation. In a precured layer, this step forms the main curing, as described in greater detail below.

In a preferred embodiment, in step c), the embossed layer is first provided in at least some regions with a reflective metal layer. In this step, the metal layer can also be produced having gaps in the form of patterns, characters or codes, for which, for example, the washing method known from publication WO 99/13157 A1 can be used.

Alternatively or in addition to the reflective metal layer, in step c), a high-index layer is advantageously applied. In particular, the high-index layer is vapor deposited through a vacuum vapor deposition process.

Further exemplary embodiments and advantages of the present invention are described below with reference to the drawings. To improve clarity, a depiction to scale and proportion was dispensed with in the drawings.

Figure 2:
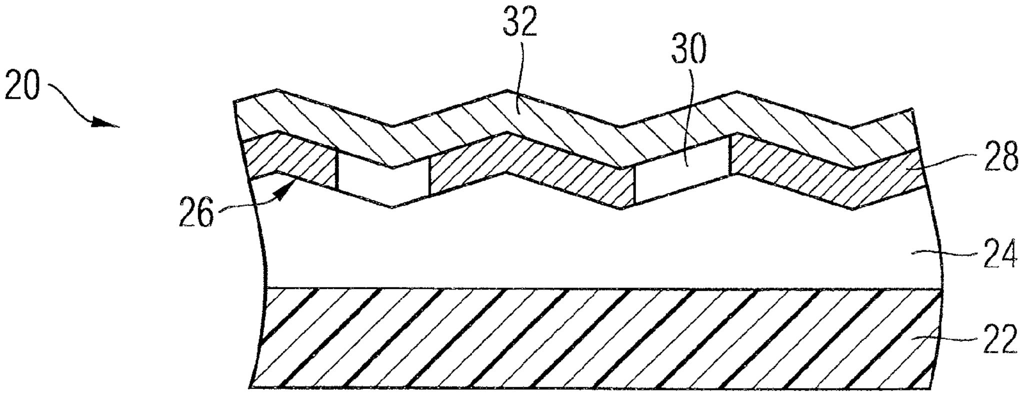
Figure 3:
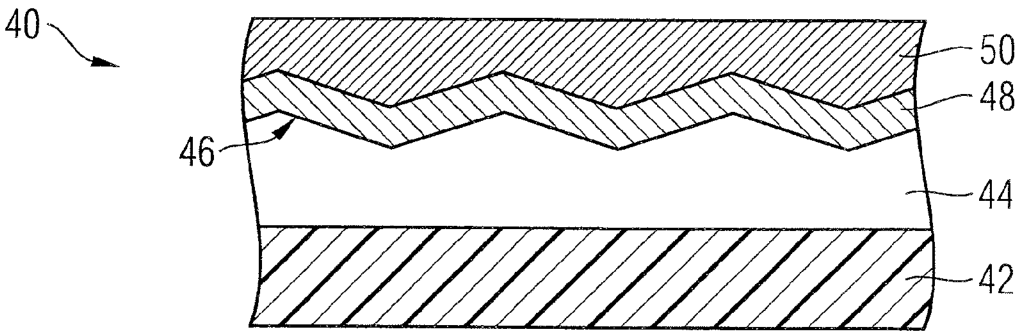
Figure 4:
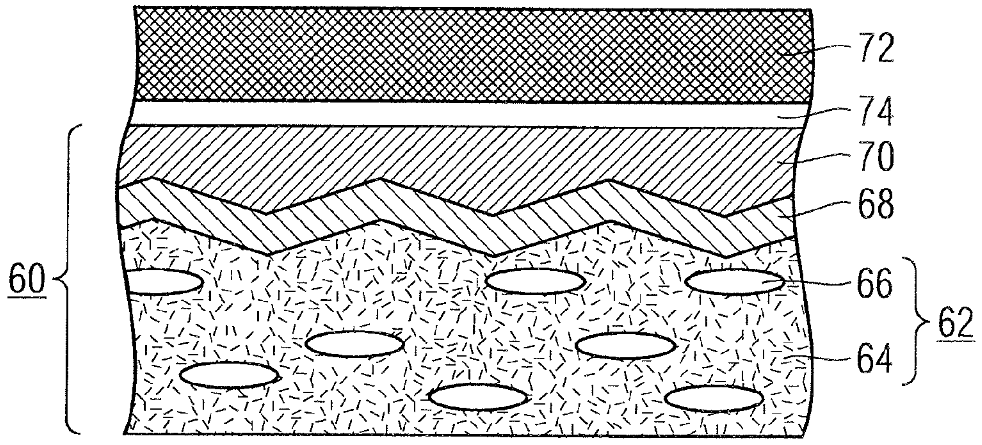

Shown are:

FIG. 1 a schematic diagram of a banknote having an embedded security thread and an affixed transfer element, FIG. 2 schematically, the layer structure of a security element according to the present invention, in cross section, and FIG. 3 a cross section through a transfer element according to the present invention prior to application to a target substrate, and FIG. 4 a cross section through a transfer element according to a further exemplary embodiment of the present invention after application to a target substrate.

The invention will now be explained using a banknote as an example. For this, FIG. 1 shows a schematic diagram of a banknote 10 that is provided with two security elements 12 and 16 according to exemplary embodiments of the present invention. The first security element constitutes a security thread 12 that emerges at certain window areas 14 on the surface of the banknote 10, while it is embedded in the interior of the banknote 10 in the areas lying therebetween. The second security element is formed by an affixed transfer element 16 of any shape.

In both security elements, a conspicuous color-shift effect is combined with a clearly visible hologram effect. To realize this especially counterfeit-proof effect combination, the security elements 12 and 16 are manufactured in the manner explained in greater detail with reference to FIG. 2 to 4.

FIG. 2 shows schematically the layer structure of a security element 20 according to the present invention, in cross section, with only the elements of the layer structure that are required to explain the functional principle being depicted.

To manufacture the security element 20, first, a lacquer layer 24 composed of a cholesteric liquid crystal material that displays the desired color-shift effect is imprinted on a plastic substrate foil 22. As the printing method, all methods that are known to the person of skill in the art and that fit the requirements of the lacquer system used can be employed.

The alignment of the liquid crystalline material preferably occurs directly via the substrate foil. However, on the substrate foil can also be provided alignment layers that align the liquid crystals, for example through the application of shear forces or electrostatically.

If a UV crosslinkable lacquer system is used, the liquid crystal lacquer layer 24 can first be precured. For this, the lacquer can include, for example, two photoinitiators that are activatable at different UV wavelengths. Also, the first photoinitiator can be UV activatable, while the second photoinitiator is activated by electron irradiation. In both embodiments, the first photoinitiator serves for precuring, which can be carried out, for example, up to the gel point of the lacquer.

Thereafter, the desired relief pattern 26 is embossed in the precured or non-precured lacquer layer 24. If the lacquer layer is not precured, then it is cured with radiation during embossing either through the substrate foil 22 or through the embossing die to the extent that a dissolving of the pattern in the context of the process is obviated. Here, the curing can occur through UV radiation or by means of electron beam.

In the case of UV curing during embossing, the embossing die can consist of a UV-transparent material, such as quartz or a suitable polymer, in order to facilitate the impingement of the lacquer layer through the embossing die. If a transparent plastic foil is used as the substrate foil, the UV curing can also occur through the foil. PET foils, for example, are transparent from the visible spectral range down to about 310 nm. Thus, commercially available UV sources can be used for curing through the substrate foil.

After the release from the embossing die, the lacquer layer 24 is cured in order to ensure freedom from tack and mechanical stability. Here, “tack free” means that the lacquer layer is substantially adhesive-free in the sense of a substantially non-sticky surface such that coated foil pieces stacked under a certain weight load can subsequently be separated again without damage. In precured lacquer layers, this second curing is the “main curing,” which is triggered by stimulating the second photoinitiator. As mentioned, the activation of the first and second photoinitiator can occur through different UV wavelengths, or also through UV radiation (first photoinitiator) and electron radiation (second photoinitiator).

The crosslinking of liquid crystal polymers upon curing, which lends the lacquer layer 24 the subsequently required structural stability, has proven to be especially advantageous.

In a further method step, a metal layer 28 having gaps 30 in the form of patterns, characters or codes is produced on the cured liquid crystal lacquer layer 24. In security printing, these gaps 30 are often designed in the form of inverse lettering. Such a metal layer having inverse lettering can be produced, for example, with the aid of the demetallization method described in publication WO 99/13157 A1. For this, the desired patterns, characters or codes are printed on the cured lacquer layer 24 with a printing ink having a high pigment portion. Due to the high pigment portion, the printing ink forms, after drying, a porous, raised ink coating. The lacquer layer that is printed on is then provided with a thin metal layer that, due to its large surface and the porous structure, only partially covers the pigment in the region of the ink coating. The ink coating and the metal layer lying over it can then be removed by washing out with a suitable solvent such that gaps 30 are produced in the metal layer in the regions that were originally printed on.

In this manufacturing stage, the hologram formed by the relief pattern 26 is now clearly perceptible and combined with a weak color-shift effect that stems from the liquid crystals of the cholesteric liquid crystal material. To increase the brilliance of the two optically variable effects, in a further method step, a high-index ZnS layer 32 is vapor deposited contiguously on the sequence of layers obtained thus far. Due to the great difference $\Delta n=(n_{ZnS}\times n_{LC})$ in the refractive indices of the ZnS-layer 32, $n_{ZnS}$, and the liquid crystal layer 24, $n_{LC}$, both the holographic effect in the demetallized regions 30 and the color effect of the color-shift effect are intensified.

In particular, the play of changing colors of the liquid crystals appears especially brilliant against a dark, absorbent background. A separate object kept behind the security element can serve as the absorbent background. For example, elsewhere on the banknote, a dark, especially black imprint can be provided over which a security element present in a window region of the banknote can be laid by bending the banknote. Alternatively, the absorbent background can be formed by a background region integrated in the security element itself, as will now be described with reference to FIGS. 3 and 4.

In the transfer element 40 in FIG. 3, a lacquer layer 44 of a cholesteric liquid crystal material having a desired color-shift effect was imprinted on a substrate foil 42, and a desired relief pattern 46 embossed in the lacquer layer 44. Thereafter, on the embossed lacquer layer 44, a high-index ZnS-layer 48 was vapor deposited contiguously and the sequence of layers obtained coated with a black printing ink 50 or a black magnetic ink.

In use as security element, the sequence of layers 40 is transferred via a heat seal system (primer/heat seal coating) or a laminating adhesive, e.g. to banknote paper or a security thread structure, and the substrate foil 42 detached. Also in the exemplary embodiment in FIG. 3, in which a metal layer was dispensed with, both the hologram included in the relief pattern 46 and the color-shift effect of the liquid crystals of the lacquer layer 44 appear brilliantly against the dark background of the black printing ink 50 due to the refractive index jump between the ZnS layer 48 and the liquid crystal lacquer layer 44.

The embossing can, but need not, be associated with a UV curing. UV curable cholesteric liquid crystal mixtures can, as mentioned above, also be suitably precured such that, although a hot-process embossing is still possible, a dissolving of the structure formed is obviated. The UV-curable cholesteric liquid crystal mixtures can also be imprinted from a solvent, especially ether, ketones or aromatics, and crosslinked after thermal solvent drying by radiation (UV or electron beam).

With reference to FIG. 4, instead of lacquer layers composed of liquid crystal polymers, also effect lacquers 62 can be used in which the cholesteric liquid crystal material is present in the form of pigments 66 embedded in a binder matrix 64. In this embodiment, the binder 64 preferably behaves thermoplastically upon embossing.

The pigments 66 can even be substantially larger in their dimensions than the embossing pattern, just as long as they are transparent. That is to say, the holographic effect does not depend on the size of the pigments, but rather is created by the embossing of the (thermoplastic) binder and the coating layer that is disposed—from the viewer's perspective—behind it and that includes a high-index and/or a metallic layer. In the exemplary embodiment in FIG. 4, the coating layer consists merely of a high-index ZnS-layer 68. To further increase the brilliance, in this exemplary embodiment, too, a black printing layer 70 is provided as the background layer.

In contrast to the depiction in FIG. 3, the depiction in FIG. 4 shows the sequence of layers of the security element 60 after the completed transfer to a target substrate, in the exemplary embodiment a banknote paper 72. For this, the sequence of layers was applied to the banknote paper 72 by means of a laminating adhesive 74, and the substrate foil needed for the manufacture of the security element detached using a separation or release layer, for example a wax layer.

The invention claimed is:

1. A security element for security papers, value documents and the like having a diffraction pattern comprising a cholesteric liquid crystalline material layer having an embossed relief pattern and a coating layer that increases the visibility of the diffraction effect of the embossed relief pattern, the coating layer including (a) a reflective layer, (b) a vapor deposited high-refractive-index (HRI) layer, or (c) both the reflective layer and the vapor deposited high-refractive-index layer;

wherein when the coating layer includes only (a) the reflective layer, the reflective layer being present in at least some areas and exhibiting gaps in the form of patterns, characters, or codes.

2. The security element according to claim 1, characterized in that the cholesteric liquid crystalline material layer is formed from a cholesteric liquid crystalline polymer material.

3. The security element according to claim 1, characterized in that the embossed cholesteric liquid crystalline material layer exhibits a layer thickness between about 1.5 μm and about 4 μm.

4. The security element according to claim 1, characterized in that the cholesteric liquid crystalline material layer is present in the form of pigments embedded in a binder.

5. The security element according to claim 4, characterized in that the binder is thermoplastic.

6. The security element according to claim 4, characterized in that the cholesteric liquid crystalline material layer exhibits a layer thickness between about 3 μm and about 10 μm.

7. The security element according to claim 1, characterized in that the liquid crystalline material layer is present in crosslinked form.

8. The security element according to claim 1, wherein the coating layer includes both the vapor deposited high-refractive-index layer and the reflective layer; and, characterized in that in the coating layer, the high-refractive-index layer is disposed over the reflective layer.

9. The security element according to claim 1, characterized in that the vapor deposited high-refractive-index layer comprises ZnS or $TiO_2$.

10. The security element according to claim 1, characterized in that the cholesteric liquid crystalline material layer is applied on a substrate foil designed for the alignment of liquid crystals.

11. The security element according to claim 1, characterized in that the cholesteric liquid crystalline material layer is applied on a substrate foil that is provided with an alignment layer for the alignment of liquid crystals.

12. The security element according to claim 1, characterized in that the security element further comprises an absorbent background region for viewing the diffraction effect and the color-shift effect.

13. The security element according to claim 12, characterized in that the background region is formed by a dark, especially black printing layer.

14. The security element according to claim 12, characterized in that the background region includes a further security feature, especially a magnetic or electrically conductive feature substance.

15. The security element according to claim 12, characterized in that the security element includes one or more further layers composed of liquid crystalline material.

16. The security element according to claim 12, characterized in that the security element is a security strip, a security thread, a label or a transfer element for application to a security paper, value document or the like.

17. A security paper for manufacturing security documents, such as banknotes, identification cards or the like, that is furnished with a security element according to claim 1.

18. A value document, such as a banknote, check, certificate, identification card or the like, that is furnished with a security element according to claim 1.

19. The security element according to claim 1, wherein the vapor deposited high-refractive-index layer is vacuum vapor deposited.

20. The security element according to claim 1, wherein the vapor deposited HRI layer is a continuous layer;

wherein:

when the coating layer includes (b) the vapor deposited HRI layer, the vapor deposited HRI layer is above the embossed relief pattern, and when the coating layer includes (c) both the reflective layer and the vapor deposited HRI layer, the vapor deposited HRI layer is above the reflective layer.

21. A security element for security papers, value documents and the like having a diffraction pattern comprising a cholesteric liquid crystalline material layer having an embossed relief pattern and a coating layer that increases the visibility of the diffraction effect of the embossed relief pattern, the coating layer including (a) a reflective layer present in at least some areas and exhibiting gaps in the form of patterns, characters, or codes, (b) a high-refractive-index (HRI) layer which is a continuous layer, or (c) both the reflective layer and the high-refractive-index layer, wherein:

when the coating layer includes (b) the HRI layer, the HRI layer is above the embossed relief pattern, and when the coating layer includes (c) both the reflective layer and the HRI layer, the HRI layer is above the reflective layer.

* * * * *